United States Patent [19]

Gordon

[11] Patent Number: 4,819,273

[45] Date of Patent: Apr. 4, 1989

[54] MINING MACHINE CONTROL SYSTEM

[75] Inventor: William Gordon, Lanark, United Kingdom

[73] Assignee: Anderson Strathclyde PLC, Motherwell, United Kingdom

[21] Appl. No.: 7,945

[22] PCT Filed: Jun. 6, 1986

[86] PCT No.: PCT/GB86/00321

§ 371 Date: Jan. 28, 1987

§ 102(e) Date: Jan. 28, 1987

[87] PCT Pub. No.: WO86/07409

PCT Pub. Date: Dec. 18, 1986

[30] Foreign Application Priority Data

Jun. 7, 1985 [GB] United Kingdom ................. 8514516

[51] Int. Cl.4 ................................................ H04B 9/00

[52] U.S. Cl. .................................... 455/605; 455/606; 455/612; 370/3; 299/30

[58] Field of Search .................... 370/3; 455/605, 606, 455/607, 608, 604, 612, 617; 299/1, 12, 30, 42

[56] References Cited

U.S. PATENT DOCUMENTS

| | | | |
|---|---|---|---|
| 4,027,210 | 5/1977 | Weber | 299/1 |
| 4,121,217 | 10/1978 | Chen | 370/1 |
| 4,146,271 | 3/1979 | Ward | 299/1 |
| 4,281,876 | 8/1981 | Lansberry | 299/1 |
| 4,395,780 | 7/1983 | Gohm et al. | 370/1 |
| 4,543,961 | 10/1985 | Bronn | 455/605 |
| 4,547,774 | 10/1985 | Gould | 455/612 |
| 4,642,804 | 2/1987 | Personick | 370/3 |
| 4,658,394 | 4/1987 | Cheng et al. | 455/605 |

FOREIGN PATENT DOCUMENTS

| | | |
|---|---|---|
| 1405520 | 9/1975 | United Kingdom . |
| 2073881 | 10/1981 | United Kingdom . |

*Primary Examiner*—Benedict V. Safourek
*Assistant Examiner*—L. Van Beek
*Attorney, Agent, or Firm*—Mason, Fenwick & Lawrence

[57] ABSTRACT

A mining machine and control system therefor for use in a possibly explosive environment, wherein the control system includes electronics within a flameproof enclosure communicating with controls outside the enclosure by way of a fiber optic link and an interface. The fibre optic link has a plurality of channels each comprising an infrared source, and outward fiber optic path, a return fiber optic path, and a detector. Between the outward and return paths, a control station is arranged to modify the light, suitably by reducing its intensity to indicate and "off" state. An alarm signal is generated in the event of no return light being detected.

7 Claims, 1 Drawing Sheet

MINING MACHINE CONTROL SYSTEM

BACKGROUND OF THE INVENTION

This invention relates to the control of mining machinery, and is particularly but not exclusively applicable to the control of longwall shearers.

Longwall shearers are sizable machines, typically 8 m–10 m long, and it is necessary for the operator to see the ends when setting the machine ready for use. It is therefore conventional to provide a control station at each end of the machine, which includes controls for a number of functions plus associated displays.

The control stations may be electrical. They must then either be flameproof, leading to high bulk, weight and manufacturing cost, or they must be "intrinsically safe" within stautory regulations, which requires rather complex and expensive interface circuitry and places constraints on physical layout. Alternatively, the control stations may be hydraulic, but this leads to complex and space-consuming hydraulic piping and maintenance is difficult in the environment of a coal mine.

None of these approaches is very satisfactory. It is therefore an object of the invention to provide a control system in a mining machine which presents no explosion risk, requires little and simple maintenance, and which is relatively simple to manufacture.

SUMMARY OF THE INVENTION

Accordingly the invention provides a mining machine including a flameproof enclosure containing electrical control equipment, at least one control station spaced from the flameproof enclosure, and a communication system between the or each control station and the electrical control equipment, the communication system comprising a number of channels each having a first fibre optic pathway communicating light from a source within the enclosure to the control station, manually operable means in the control station for selectively modifying the light received, a second fibre optic pathway returning the modified light to the enclosure, and monitoring means within the enclosure responsive to the light received.

The channels may be physically separate pathways operating in parallel, or may be provided by multiplexing on a pair of common pathways.

The modification of the light is preferably in the form of no modification for a "1", and the interposition of a filter to reduce the intensity of the returned light for a "0", with the absence of returned light indicating a fault.

The light is preferably of a frequency beyond the visible spectrum, suitably infrared, to prevent unintended operation by ambient light inadvertently entering the system.

An embodiment of the invention will now be described, by way of example only, with reference to the drawings

DETAILED DESCRIPTION OF A PREFERRED EMBODIMENT

Figure 1:
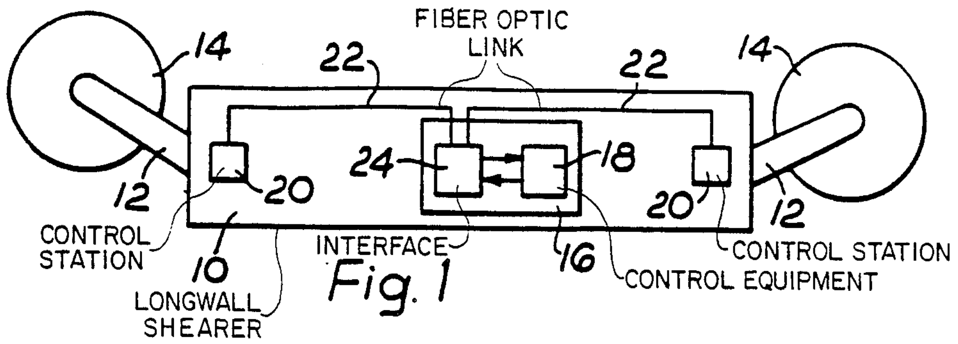
FIG. 1 is a schematic illustration of a longwall shearer embodying the invention.

Referring to FIG. 1, a longwall shearer has a main body 10 at each end of which are vertically pivotable ranging arms 12 carrying shearer drums 14. A flameproof enclosure 16 in the main body contains electrical control equipment indicated at 18, typically in the form of relays or thyristors which control motors or solenoid valves at various locations on the machine. A control station 20 is provided adjacent each end of the main body 10. Each control station has manually operable controls for a number of functions such as drum raise/-lower, haulage direction and desired haulage speed. Some functions are on/off and some involve a range of values.

The machine as described thus far is conventional. In accordance with the invention, the control stations 20 communicate with the control equipment 18 via a fibre optic link 22 and interface 24.

Figure 2:
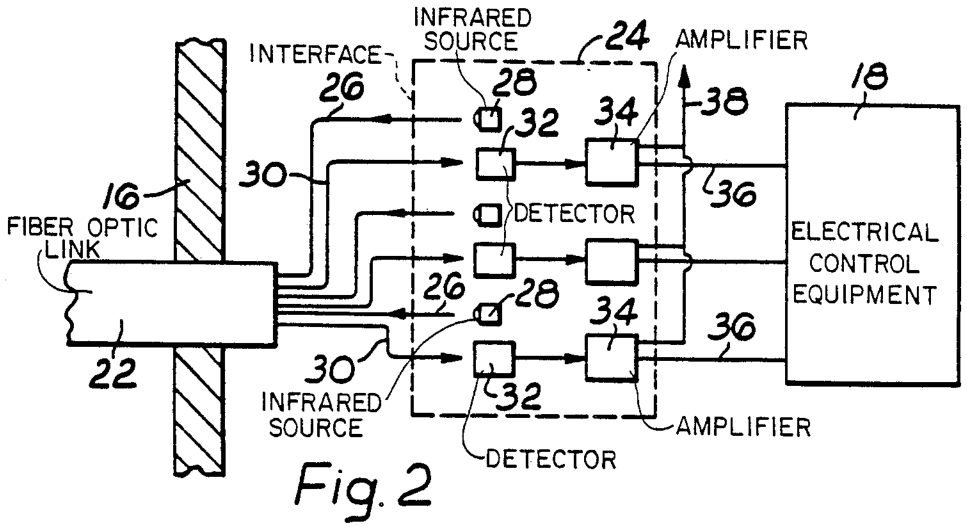
FIG. 2 illustrates part of FIG. 1 in more detail.

Reference is now made to FIG. 2, which shows three channels by way of example. Each channel has a first fibre optic path 26 which transmits light from an infrared source 28 (e.g. a light-emitting diode) to the control station where it is modified as will be described and returned by a second path 30. The returned light is detected by a detector 32 to provide an electrical signal to a level detector and amplifier 34. This in turn classifies the signal as high or low to give a control signal on line 36. If there is no returned light, for example owing to breakage of the link 22, an alarm signal is generated on line 38 to close down the machine. Various forms of electronic circuit suitable for effecting this level detection will be readily apparent to those skilled in the art.

Figure 3:
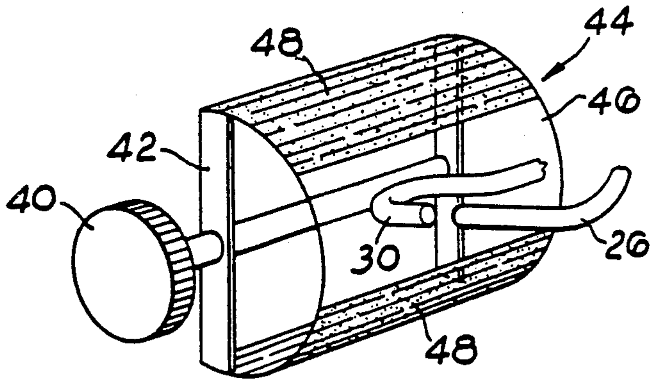
FIG. 3 is a diagrammatic perspective view of one form of switch for use in the control station.

The control station preferably operates to pass the light unmodified for an "on" signal and at a reduced intensity for an "off" signal. One means of doing so is illustrated in FIG. 3. A manual control knob 40 rotates a frame 42 carrying a curved plastics sheet 44 having a transparent sector 46 and coloured filter sectors 48. The ends of the light fibre optic paths 26,30 face each other on opposite sides of the sheet 44.

This provides a simple "on-off" or "0–1" indication. Variable parameters can be dealt with by an extension of this technique using a number of binary digits and a corresponding number of fibre optic paths. In this case the sheet 44 can carry rows and columns of clear and filter areas defining a binary code. The returned light can be detected by a similar number of photosensitive devices and decoded by well-known techniques.

Modifications to the above may be made. For example, all the outward fibre optic paths may be illuminated by a common light source. The parallel paths could be replaced by common paths using multiplexed pulsed light signals. The fibre optic link 22 may additionally contain one or more channels for giving indications to the operator by appropriate illumination or suppression of a visible light source within the enclosure 16.

I claim:

1. A mining machine including a flameproof enclosure containing electrical control equipment, at least one control station spaced from the flameproof enclosure and a communication system between the control station and the electrical control equipment, the communication system comprising a number of channels each having a first fibre optic pathway communicating light from a source within the enclosure to the control station, manually operable means in the control station for selectively modifying the light received, a second fibre optic pathway returning the modified light to the enclosure, the manually operable means including means for varying the intensity of the returned light to provide a first intensity level and a second intensity level in accordance with predetermined positions of the manually operable means, and a monitoring means being responsive to the absence of return light to generate an alarm signal.

2. A machine according to claim 1, in which the light is infrared.

3. A machine according to claim 1, in which the channels are physically separate pathways operating in parallel.

4. A machine according to claim 1, in which the channels are provided by multiplexing on a pair of common pathways.

5. A machine according to claim 1, in which the light is infrared.

6. In a mining machine including a flameproof enclosure containing electrical control equipment, at least one control station spaced from the flameproof enclosure, and a communication system between the control station and the electrical control equipment; the improvement in which the communication system comprises;

a number of channels each having a first fibre optic pathway communicating light from a source within the enclosure to the control station, manually operable means in the control station for selectively modifying the light received, a second fibre optic pathway returning the modified light to the enclosure, and monitoring means within the enclosure, responsive to the light received;

said manually operable means comprising first and second portions interposed selectively between said first and second pathways to provide returned light of first and second intensities, respectively; and said monitoring means being responsive to absence of returned light to generate an alarm signal.

7. A mining machine including a flameproof enclosure containing electrical control equipment, at least one control station spaced from the flameproof enclosure and a communication system between the control station and the electrical control equipment, the communication system comprising a number of channels each having a first fibre optic pathway communicating light from a source within the enclosure to the control station, manually operable means in the control station for selectively modifying the light received, a second fibre optic pathway returning the modified light to the enclosure, and monitoring means within the enclosure responsive to the light received, the manually operable means being operable to vary the intensity of the returned light, and the returned light having either a first or a second intensity in dependence on the manually operable means, and the monitoring means being responsive to absence of returned light to generate an alarm signal.

* * * * *